US007490808B2

(12) United States Patent

Lemirande

(10) Patent No.: US 7,490,808 B2

(45) Date of Patent: Feb. 17, 2009

(54) STACKABLE JACK STANDS

(76) Inventor: Timothy J. Lemirande, 3744 Swoboda Rd., Verona, WI (US) 53593

( * ) Notice: Subject to any disclaimer, the term of this patent is extended or adjusted under 35 U.S.C. 154(b) by 653 days.

(21) Appl. No.: 10/957,713

(22) Filed: Oct. 5, 2004

(65) Prior Publication Data

US 2006/0071139 A1 Apr. 6, 2006

(51) Int. Cl.
*F16M 11/00* (2006.01)

(52) U.S. Cl. ...................................................... 248/637

(58) Field of Classification Search ................. 248/676, 248/674, 127; 116/63 R, 63 P, 63 T; 472/118, 472/125

See application file for complete search history.

(56) References Cited

U.S. PATENT DOCUMENTS 715,530 A * 12/1902 Wallace ....................... 482/38
2,817,522 A * 12/1957 Margulies ................... 482/145
4,548,418 A 10/1985 Wendorff
4,783,936 A * 11/1988 Hujsak ........................ 52/108
5,072,901 A 12/1991 Scott
5,546,722 A * 8/1996 Huang ......................... 52/646
6,047,932 A 4/2000 Skvorecz
6,994,655 B2 * 2/2006 Chu ............................ 482/38

FOREIGN PATENT DOCUMENTS

GB 2102362 A 2/1983
GB 2391209 A 2/2004

* cited by examiner

*Primary Examiner*—J. Allen Shriver
*Assistant Examiner*—Steven Marsh
(74) *Attorney, Agent, or Firm*—Richard C. Litman

(57) ABSTRACT

The stackable jack stands have a base defining a central opening, a support bar centrally disposed above the base, and a plurality of legs connecting the open base to the support bar. The support bar has a length less than the length of the central opening in the base. In this manner one jack stand may be placed over another so that the jack stands nest together in order facilitate storage and transportation.

8 Claims, 4 Drawing Sheets

STACKABLE JACK STANDS

BACKGROUND OF THE INVENTION

1. Field of the Invention

The present invention relates to jack stands, and particularly to a jack stand that allows multiple stands to be stacked upon one another in order to facilitate storage and transportation of the jack stands.

2. Description of the Related Art

Jack stands are used for many purposes, one of the most common being to support a vehicle while it is being maintained or repaired. Typically, a car is raised using a jack, and then a jack stand is placed under the frame of the vehicle next to the jack, and the jack is subsequently lowered and removed. One of the most common types of jack stands is the adjustable variety that consists of a tripod base with a central telescopic member. A disadvantage to most jack stands is they are bulky and awkward to store or carry. This is particularly a problem for automotive specialists who must carry their tools to different sites, such as racecar crews. Accordingly, there is need for a jack stand that is easy to store and carry.

U.S. Pat. No. 5,072,901, issued Dec. 17, 1991 to Lyle Scott, shows a pipe support stand for supporting pipeline, the stand being stackable. The pipe support stand is a hollow pyramidal body made of plastic with an arcuate recess in its top surface for receiving the pipe and a pair of centrally located ribs on each side of the hollow body. U.S. Pat. No. 4,548,418, issued Oct. 22, 1985 to Donn Wendorff, teaches a trailer support stand made of skid bars having an open base and upwardly extending arms. The trailer support stand has a triangular base and is also fitted with a trailer hitch. U.S. Pat. No. 6,047,932, issued Apr. 11, 2000 to Robert Skvorecz, describes a wire chafing stand that is stackable and constructed from steel wire. United Kingdom Patent Application No. 2,102,362, published Feb. 2, 1983, discloses a vehicle wheel hub support stand that is bolted to the wheel hub of an automobile. United Kingdom Patent Application No. 2,391,209, published Feb. 4, 2004, shows a light vehicle safety stand used in conjunction with a car jack featuring movable support legs. Algonac Stackable Jack Stands, shown on a web page published at www.mindernanmarine.com, at least as of Aug. 31, 2004, shows a jack stand having a triangular base that is stackable.

None of the above inventions and patents; taken either singly or in combination, is seen to describe the instant invention as claimed. Thus a stackable jack stand solving the aforementioned problems is desired.

SUMMARY OF THE INVENTION

The stackable jack stand has a generally rectangular open base, a laterally extending support bar centrally disposed above the open base, and a plurality of legs connecting the open base to the support bar. The support bar has a length less than the length of the open base. In this manner one jack stand may be placed over another so that the jack stands nest together in order to facilitate storage and transportation.

Accordingly, it is a principal object of the invention to provide a jack stand that is stackable for easy storage and transportation.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
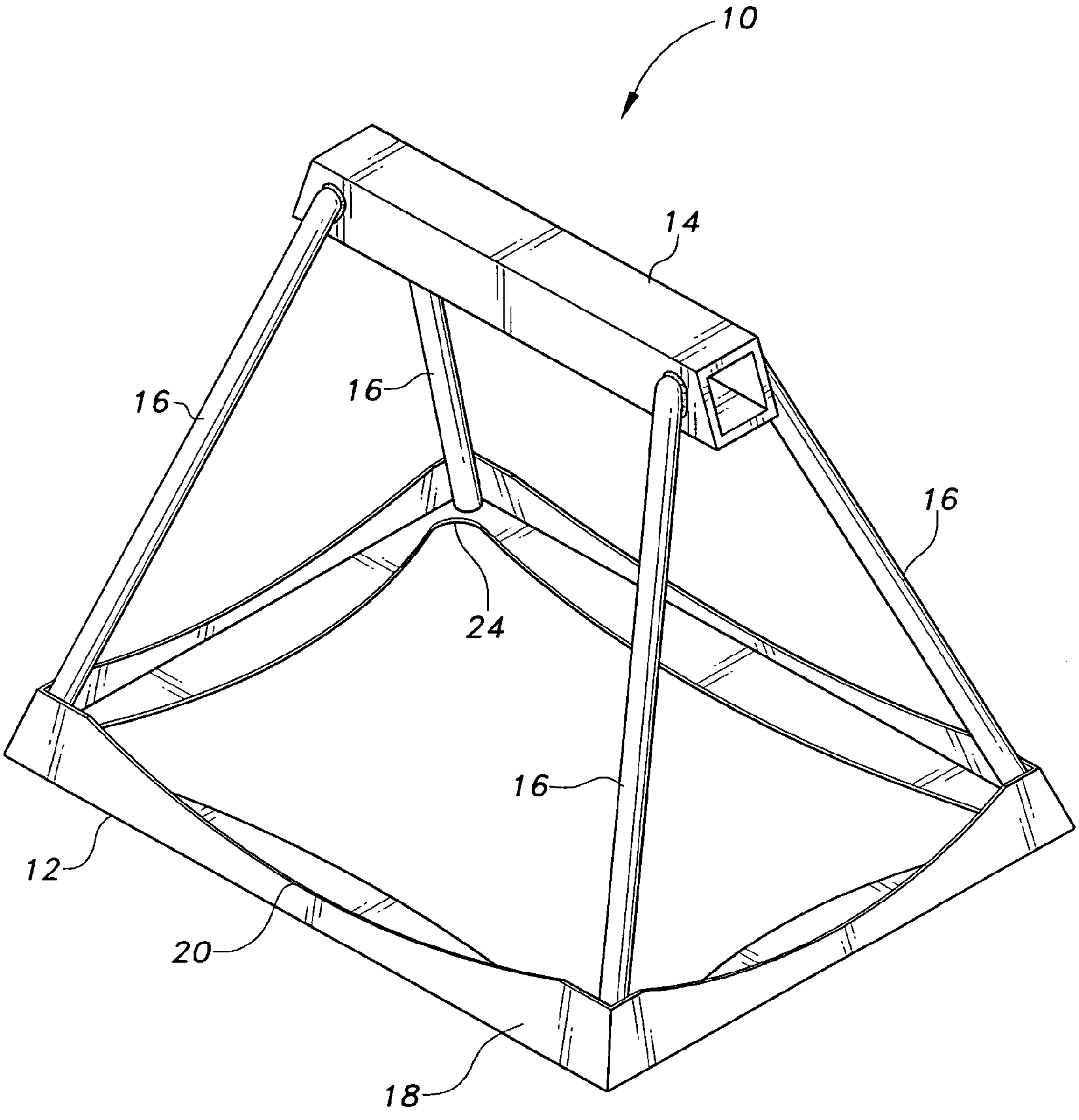
FIG. 1 is a perspective view of a stackable jack stand according to the present invention.
Figure 2:
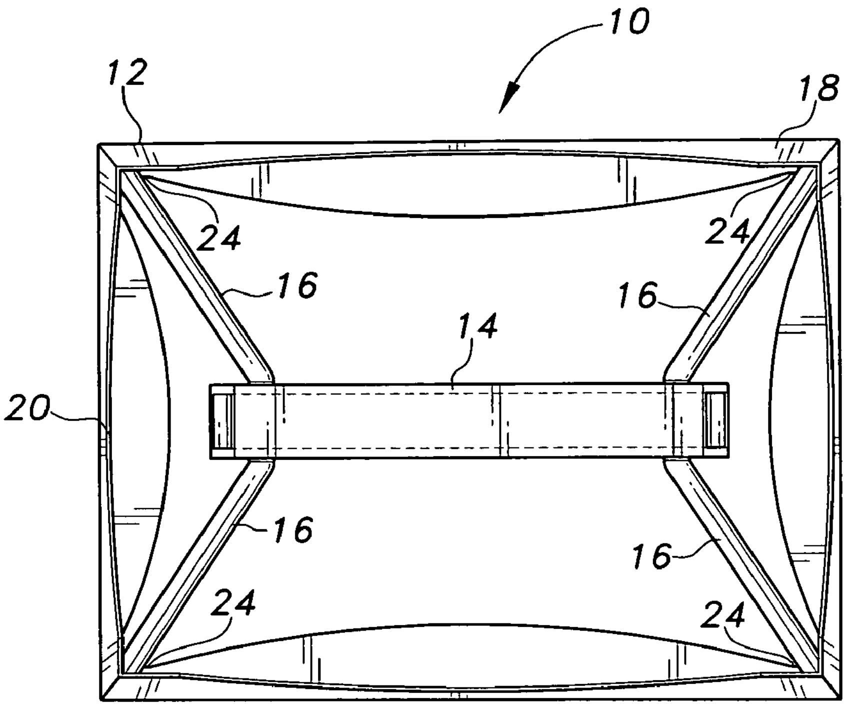
FIG. 2 is a top view of the stackable jack stand according to the present invention.
Figure 3:
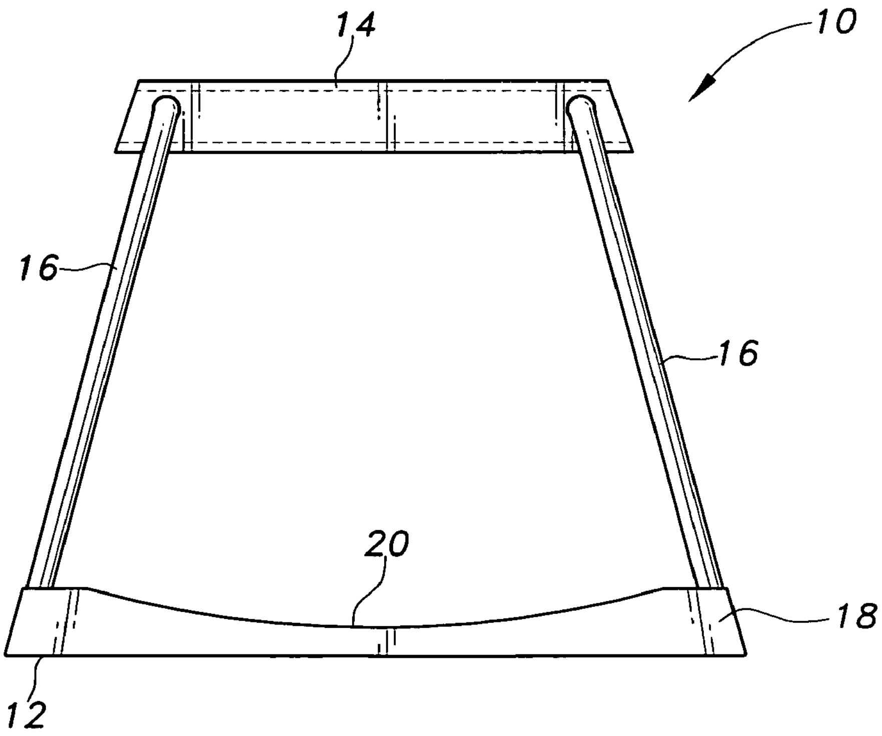
FIG. 3 is a front view of the stackable jack stand according to the present invention.
Figure 4:
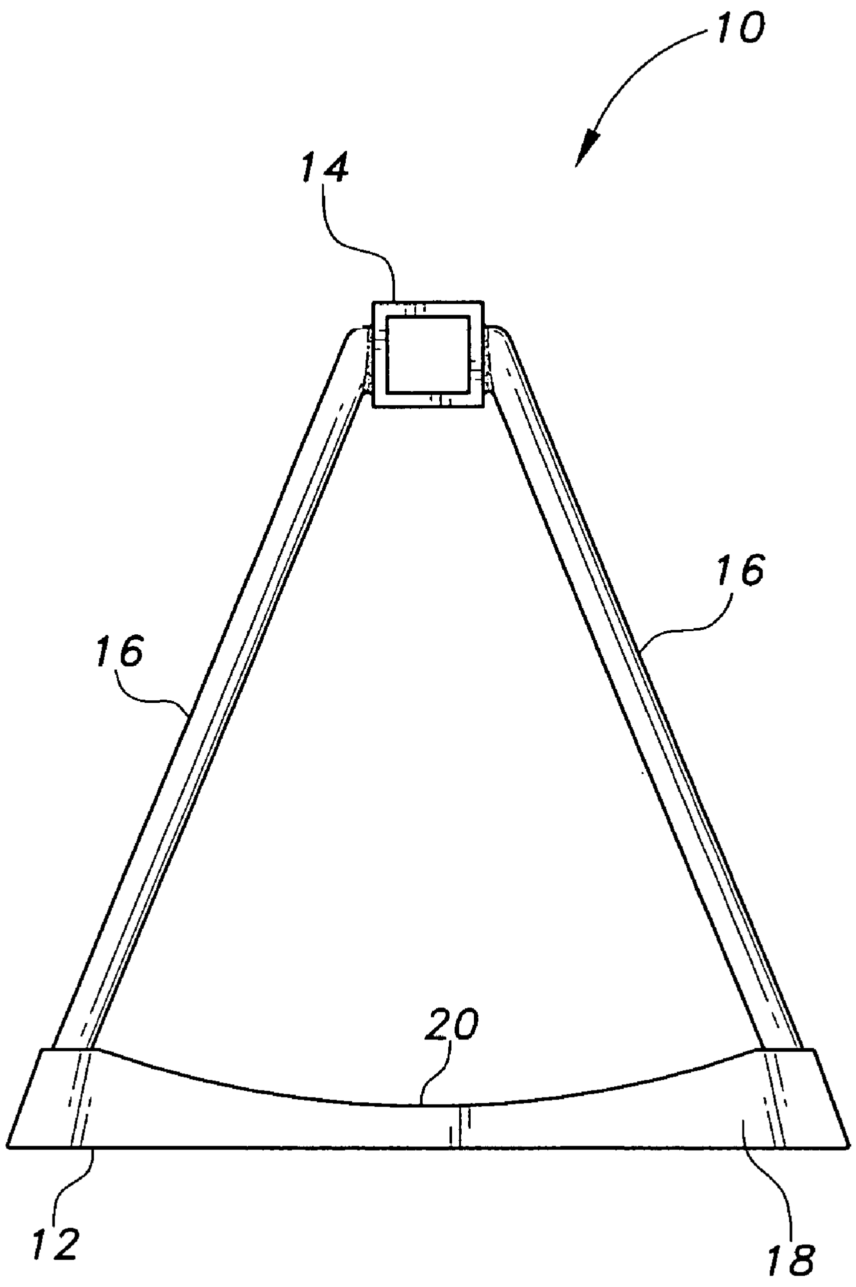
FIG. 4 is a side view of the stackable jack stand according to the present invention.

The present invention is a stackable jack stand, designated generally as 10 in the drawings. As shown in FIGS. 1-4, the stackable jack stand 10 comprises a base 12, a laterally extending support bar 14 or saddle centrally disposed above the base 12, and a plurality of legs 16 connecting the base 12 to the support bar 14. In the embodiment shown in the drawings, the base 12 is rectangular and there are four legs 16 made of cylindrical rods, the support bar 14 being made of square tubing. However, it will be understood that the support bar 14 may be a solid bar, a plate, or any other member capable of supporting a vehicle frame. Although the base 12 is shown having a rectangular shape with four legs 16 arising from the base 12, it will be understood that the base may have any other stable supporting configuration, e.g., triangular, and a corresponding number of legs extending between the base and the support bar. The legs 16 are connected to each of the four corners of the base 12. The legs 16 then angle upwards and are attached to the support bar 14. One pair of legs 16 is attached to each end of the support bar 14.

In the embodiment shown in FIGS. 1-4, an upwardly extending flange 18 surrounds the perimeter of the base 12. The flange 18 adds rigidity to the stackable jack stand 10. The flange 18 also gives additional surface area for the attachment of the legs 16. The flange 18 can have a notch 20 along its upward edge in order to reduce the overall weight of the stackable jack stand.

Figure 5:
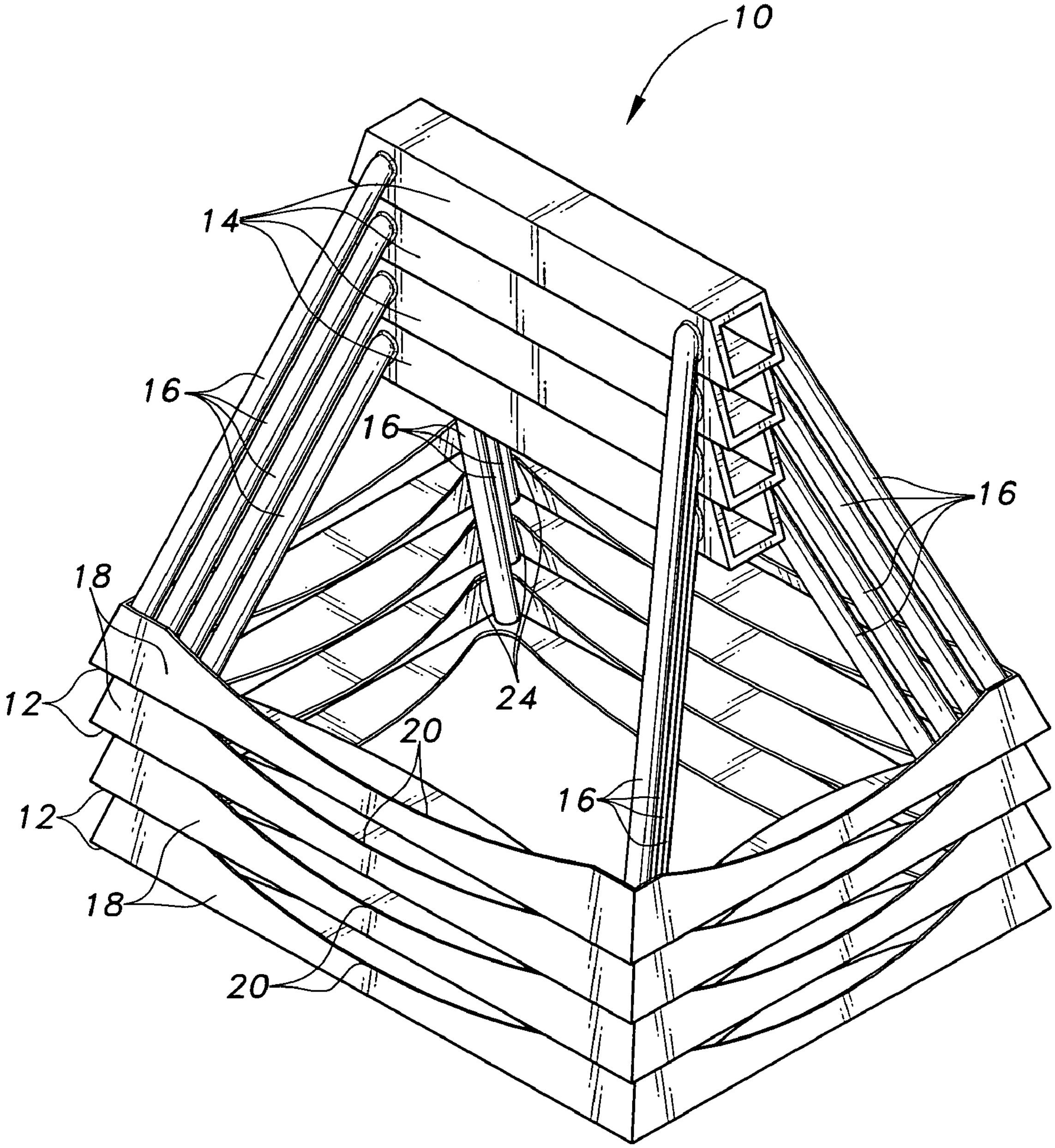
FIG. 5 is a perspective view of stackable jack stands according to the present invention nested together.

The stackable jack stand 10 has a central opening defined by the base 12 and a support bar 14 that can pass through the open base 12, so that the stackable jack stands 10 may be nested together, as shown in FIG. 5. In order to facilitate the nesting of the stackable jack stands 10, the base 12 is formed with a central opening that is configured to facilitate nesting of the stands. For this purpose the base 12 may be formed from a single sheet of metal having the central area cut out by laser, or by a laser-guided cutting tool, or other precision machining tool that enables the corners of the cutout to be formed or shaped in a manner that closely complements the shape of the legs 16. For example, when the legs 16 are formed from cylindrical rods, the use of laser cutting allows fillets 24 to be cut in to the inner corners of the open base 12. Fillets 24 allow for the curvature of the legs 16 and provide for closer nesting of the stackable jack stand 10, as shown in FIG. 5. It will be understood that legs 16 may be made from plates or any other structural member, the corners in the base 12 having an appropriately shaped recess formed therein to enable the stands 10 to slide over each other as far as possible for compact storage and transport.

It is contemplated that the stackable jack stand 10 can be constructed from various materials and in varying dimensions. Materials contemplated include aluminum and mild steel. Dimensions of the stackable jack stand 10 are based on its intended application. For use with an automobile, the stackable jack stand 10 may have an overall height of between nine inches and fourteen inches. The angle of the legs 16 to the open base 12 may vary but must not be greater than 800 so that the stackable jack stands 10 do not wedge together when stacked.

It is to be understood that the present invention is not limited to the embodiments described above, but encompasses any and all embodiments within the scope of the following claims.

I claim:

1. A stackable jack stand, comprising:

a substantially rectangular base defining a central opening and having an upwardly extending flange and a planar inner surface surrounding the central opening, said planar inner surface including fillets defined at corners of said base to facilitate stacking of the jack stands;

a support bar centrally disposed above the base, the support bar being shorter than the central opening defined in the base; and a plurality of legs connecting the support bar to the base adjacent said fillets, whereby at least two identical jack stands are stackable with the legs of one jack stand snugly disposed about the fillets of the other jack stand.

2. The stackable jack stand according to claim 1, wherein the stackable jack stand is made of mild steel.

3. The stackable jack stand according to claim 1, wherein the stackable jack stand is made of aluminum.

4. The stackable jack stand according to claim 1, wherein the angle of the legs to the open base is less than 80°.

5. The stackable jack stand according to claim 1, wherein the open base is of one-piece construction.

6. The stackable jack stand according to claim 1, wherein the support bar is made from square tubing.

7. The stackable jack stand according to claim 1, wherein the legs are cylindrical rods.

8. The stackable jack stand according to claim 1, wherein said base comprises a plate having the central opening laser-cut therein.

* * * * *